United States Patent
Gwathmey et al.

[15] 3,681,580
[45] Aug. 1, 1972

[54] ROTATION, CLIMBOUT, AND GO-AROUND CONTROL SYSTEM

[72] Inventors: Edward S. Gwathmey; John M. Embree, both of Charlottesville, Va.

[73] Assignee: Teledyne, Inc., Los Angeles, Calif.

[22] Filed: Aug. 1, 1969

[21] Appl. No.: 846,737

[52] U.S. Cl..............................235/150.22, 244/77
[51] Int. Cl. ..........................G06g 7/78, G01c 23/00
[58] Field of Search ....................235/150.22; 244/77

[56] References Cited

UNITED STATES PATENTS

| | | | |
|---|---|---|---|
| 2,958,483 | 11/1960 | McRuer et al. | 244/77 |
| 3,510,090 | 5/1970 | Falkner et al. | 244/77 |
| 3,510,092 | 5/1970 | Hendrick et al. | 244/77 |

*Primary Examiner*—Eugene G. Botz
*Assistant Examiner*—Edward J. Wise
*Attorney*—Robert R. Strack and Ralph E. Bucknam

[57] ABSTRACT

We call out system an RGA system which is an abbreviation for "ROTATION-GO-AROUND". Data concerning pitch, angle of attack, longitudinal acceleration, elevator position, and flap position are used by the RGA computer to compute the take-off and go-around vertical steering signal presented to a pitch steering display to show the pilot the necessary corrective measures to approach and/or hold a computed pitch attitude. Selection of RGA mode: (a) AC-CL, (accelerated climb); (b) MAX (maximum climb angle), and (c) EWO (Emergency War Order Operation) must be manually programmed by the pilot for a take-off. No manual programming is required for the go-around. The RGA Interface Unit processes the analog flap signals into discrete voltage steps, averages and cross-monitors the left and right angle of attack signals, and provides RGA vertical steering cross-monitoring in a dual system (for pilot and co-pilot). The RGA Control Unit provides the means by which the pilot selects the desired take-off climb operation and the approach speed deviation display. The control unit uses the flight director RGA mode voltage, a weight-on-wheels discrete signal, and the momentary voltage from the control wheel go-around switch to generate the necessary RGA system logic. Angle of attack and flap position data are combined for presentation of normalized angle of attack by the angle-of-attack indicator. The angle-of-attack indicator also provides an auxiliary approach-angle-of-attack deviation output for presentation on the FAST-SLOW display. When selected, this signal indicates to the pilot what corrective measures are required to hold the optimum approach angle-of-attack, and hence, the appropriate approach speed regardless of aircraft weight or configuration.

9 Claims, 4 Drawing Figures

Fig. 4 RGA COMPUTER SIMPLIFIED BLOCK DIAGRAM (FLOW DIAGRAM)

3,681,580

ROTATION, CLIMBOUT, AND GO-AROUND CONTROL SYSTEM

BACKGROUND OF THE INVENTION

This invention relates to aircraft instrument systems and has particular reference to an aircraft system having airborne units designed to provide take-off and go-around vertical steering and FAST-SLOW displays, respectively.

In considering take-offs from aircraft carriers, especially, we soon recognized that care was necessary to avoid phugoid oscillation following the rotation. This led to our study of the problem of angle-of-attack as a control parameter for rotation and climb-out. In connection with this subject we refer to NASA Publication TND-948 in Sept. 1961 by Albert Hall and Jack Harris, entitled "A Simulator Study of the Effectiveness of a Pilot's Indicator Which Combined Angle of Attack and Rate of Change of Total Pressure as Applied to the Take-off Rotation and Climbout of a Supersonic Transport." They gave, as their basic equation $$e \sim \Delta\alpha - kP \qquad (1)$$

where $e$ is the error signal, $\Delta\alpha$ is the difference between actual and reference angle of attack, and $P$ is total pressure. For climbout speeds a good approximation is $$P = q + S$$

where $q$ is dynamic pressure and $S$ is static pressure. The time rate of change of $P$ becomes, considering air density $\rho$ a constant, $$\dot{P} = \dot{q} + \dot{s} = 92 v\dot{v} - \rho g \dot{h} \qquad (2)$$

showing that $\dot{P}$ contains components proportional to acceleration along the flight path ($\dot{v}$) and to vertical speed ($\dot{h}$); $g$ being the well-known acceleration due to gravity. In equation (2) the two components can be identified more exactly as proportional, respectively, to the rates of change of the kinetic and potential energy of the aircraft. However, we have discovered an inherent defect in principle in equation (1) and our recognition of the defect has influenced the design of certain details of our invention. Fundamentally, equation (1) cannot be non-dimensionalized unless $k$ is inversely proportional to $\rho v$. Thus, either the value of $\rho v$ must be dialed into the director before take-off or go-around, or, the climb profiles will become progressively shallower with increasing gross weight. This problem is particularly acute for some types of aircraft.

We have built and tested numerous of our RGA systems based on angle of attack combined with vertical speed, acceleration along the flight path combined with augmented vertical speed, and other combinations such as angle of attack and elevator signal. We found, after considerable experimentation that the preferred combination, for consistent and reliable results, with adequate smoothing of the angle of attack component, would be pitch information and angle of attack. The difference between pitch attitude and angle of attack is climb angle. This provides in proper non-dimensional form the performance parameter which we attempted in one experiment to represent the vertical speed. The latter could be non-dimensionalized by dividing it by true airspeed. This course, aside from complexity, would not resolve the indeterminacy and gross weight dependence associated with ground effect during take-off rotation and flare. Our conception of using climb angle as the starting point of a practical, effective, RGA system was important. It is possible to correlate the climb angle $\gamma$ following take-off flare with the generalized climb-out factor K, which establishes the profile data of the flight manual of a particular aircraft.

K factor = $100 \times \sin \gamma$ where $\gamma$ = flight path angle
This may be understood mathematically by considering the form of the pitch steering command equation when equilibrium is established during climb-out. For ideal, steady state conditions, the pitch steering command $\epsilon$ reduces to $$\epsilon = \theta_c - \Delta\theta - K_1 \Delta\alpha \qquad (3)$$

where $\theta_c$ represents the rotation command, $\Delta\theta = \theta - \theta_R$, $\theta_R$ is the pitch attitude measured at $V_R$ when the pilot depresses the yoke switch G/A switch), $\theta$ is current pitch attitude, $K_1$ is a fixed, positive dimensionless constant, $\Delta\alpha = \alpha - \alpha_R$, $\alpha_R$ being obtained during take-off and $\alpha$ is the current value of angle of attack.

For $\epsilon = 0$ (nulled command) and substituting $\theta = \alpha + \gamma$ and $\theta_R = 0$ for simplicity in equation (3) this equation becomes $$\alpha = \frac{K_1 \alpha_R + \theta_c}{K_1 + 1} - \frac{\gamma}{K_1 + 1} \qquad (4)$$

where $\gamma$ is the climb angle and the first term on the right is a constant. Since equation (4) applies to the equilibrium state, well known lift and drag equations provide the following:

$$\gamma = T/W - D/L \qquad (5)$$

where $T$ = thrust, $W$ = gross weight, $D$ = drag, and $L$ = lift. The approximation $\sin \gamma = \gamma$ in equation (5) corresponds to the approximation assumed in the derivation of flight manual climb gradients. Since the climbout factor K represents a selected value of the right hand side of equation (5) it is clear that the steady-state value of angle of attack commanded by equation (4) becomes progressively smaller with increasing K values. This is the character of the flight manual profiles.

The question is whether $K_1$ can be chosen and the take-off flare molded by the transient behavior of the complete director equation in conjunction with the aircraft's longitudinal equations so that the system will undergo transition from lift-off to the equilibrium state expressed by equations (4) and (5), in a well controlled and aperiodic manner, resulting in all cases in the profiles given in the flight manual. As a specific example we used the non-linear lift and drag equations of the KC-135A aircraft together with the complete director equation and the linearized version of the pitch equation, in a simulator, to provide an affirmative answer. It has been confirmed that profiles are insensitive to the pitch equation, for example, by varying the pitch moment of inertia by a factor of two.

SUMMARY OF THE INVENTION

Many prior instruments and instrument systems have been designed for the purpose of providing better safety in flying and especially during take-off and landing operations. These have been deficient in operation, particularly with regard to safety, ease of pilot operation, effective display, and other characteristics.

It is therefore an object of our invention to provide a rotation-go-around system which will be of marked assistance to the pilot in take-off and landing operations including go-around.

Another object is to provide a rotation-go-around instrument system which displays the indications simply and effectively.

A further object is to provide a rotation-go-around instrument system which will provide greater safety in aircraft operation than furnished by prior instruments or instrument systems.

Another object is to provide means for rotation or assisting in rotation of an aircraft through the correct pitch angle to the correct angle of attack, neither over-rotating nor under-rotating, and safely adapting for wide difference in pilot technique.

A further object is to provide means for obtaining the correct climbout speeds and pitch attitudes required to make obstacle clearance in accordance with the flight manual of the aircraft being flown.

An additional object is to provide means for making a continuously accelerated climb to clean up (raise flaps) before the end of water injection at a predictable, safe altitude, when maximum close-in obstacle clearance is not a major requirement.

A still further object is to provide means for obtaining continuous vertical steering for optimum guidance following partial or total loss of thrust caused by loss of one or more engines or loss of water injection; staying well away from stall.

Another object is to provide means, on go-around for missed approaches, to rotate the aircraft to the optimum angle for thrust available, with minimum loss of altitude from any controlled rate of descent which is normally used on the approach.

A general object is to provide a vertical steering cue for the pilot which will guide him through rotation and climbout so that he can safely, easily, and confidently handle the aircraft under circumstances indicated above.

Other objects will be evident in the following description.

DESCRIPTION OF THE PREFERRED EMBODIMENTS

Figure 1:
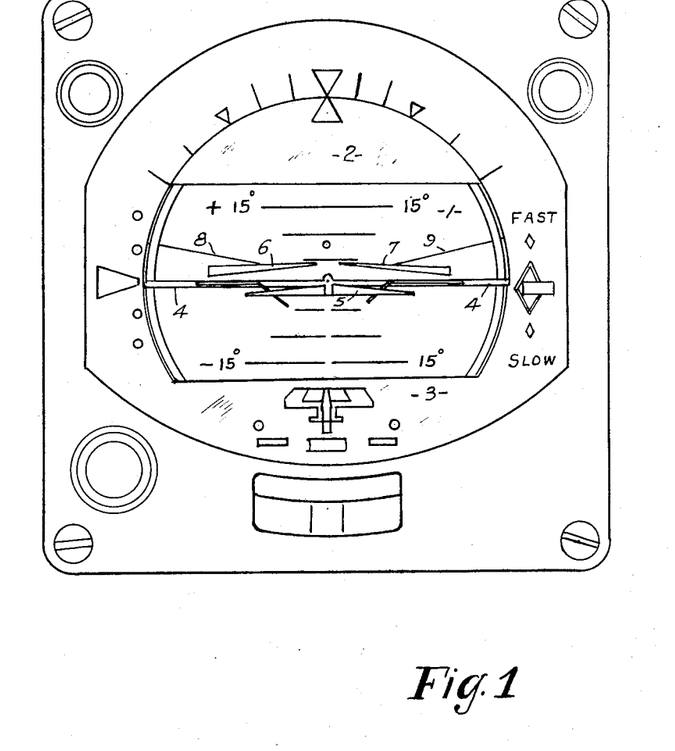
FIG. 1 is a face view of a Collins FD-109 Flight Director which can be used with our RGA system as can several other makes of director.

The invention is concerned with developing control signals for positioning the command bars on a conventional FLIGHT DIRECTOR such as the Collins unit illustrated in FIG. 1. This command signal is an analog voltage and moves the command bars 6 and 7 in the appropriate manner to guide the pilot in adjusting the attitude of the plane either at take-off or when it is necessary to go-around following an unsuccessful approach. It will be appreciated that the instructions concerning pitch differ with each plane and it has been found that a number of factors are important in connection with the pitch commanded. In the past, the pilot was given only a fixed pitch command which did not take into effect elements such as the longitudinal or normal acceleration of the craft, the angle of attack, the flap position, or the rate of change of the elevator. Means for sensing each of the above cited elements have long existed; however, the utilization of the sensed information has not been employed for developing the pitch command information made available by the present invention. In other words, this invention relates to the unique utilization of a new control signal which can reliably assist a pilot in controlling the pitch of his plane during take-off or go-around.

Figure 4:
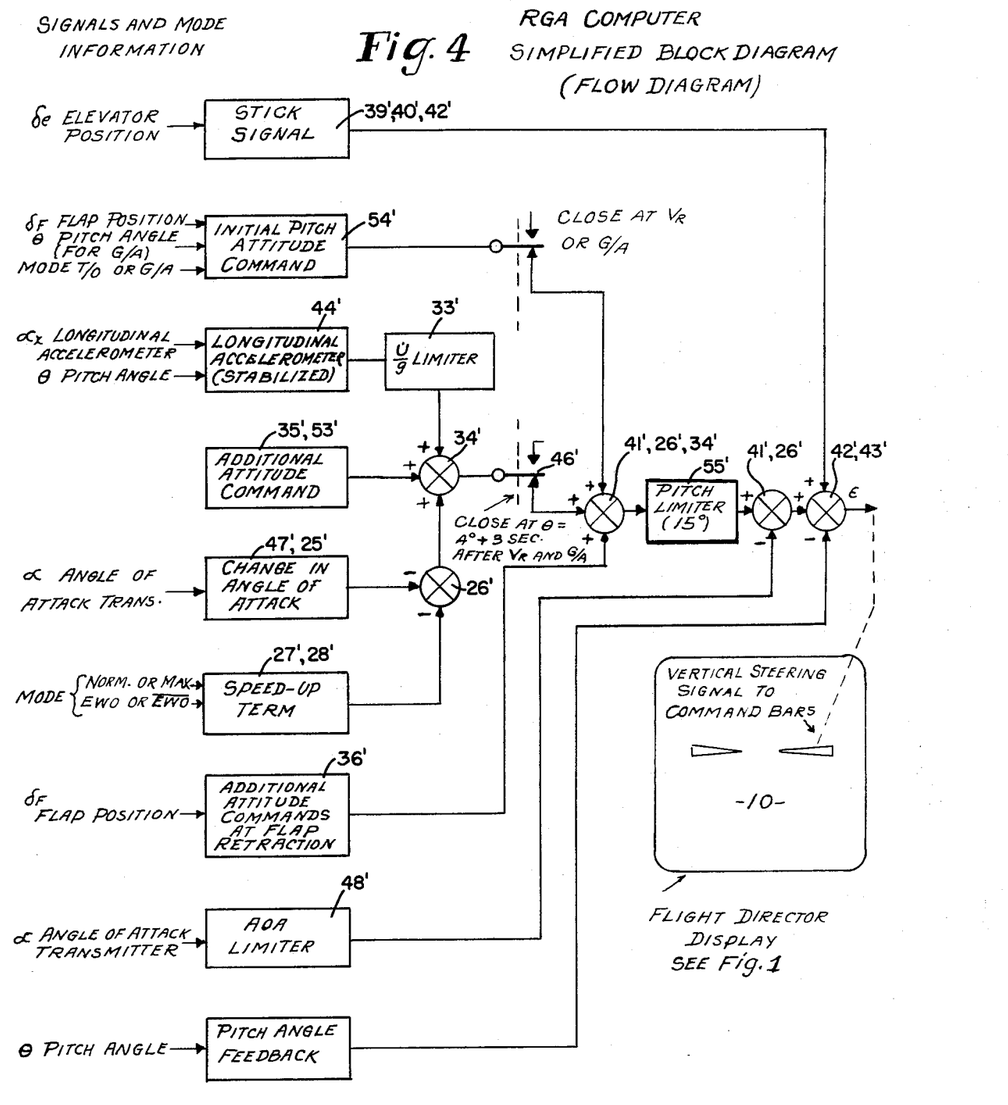
FIG. 4 is a simplified block diagram (flow diagram) for our RGA system.

In FIG. 1 the flight director may be any one of several available instruments but the flight director which we used was made by Collins Radio Company. The lines indicating angle above and below the horizon are made on a tape, belt, or web 1, hereinafter called the "tape," which can be driven in either "up" or "down" direction by a suitable motor in the instrument. This tape is moved beneath masking plates 2 and 3 fixed to the instrument. A 0° line 4 representing the horizon is clearly marked on the tape and the three-dimensional symbol 5 represents the carrying aircraft. Command bars 6 and 7 which move in unison, are movable "up" or "down" relative to the aircraft symbol 5 by means of attached wires 8 and 9 which are connected with the instrument mechanism. At null these command bars are in register with the aircraft symbol 5. The flight director 10 of FIG. 4 is the same as the device shown in FIG. 1. In FIG. 4, however, the details of the instrument face are not shown.

The attitude tape or belt 1 moves to provide roll information and gives linear pitch indication through 90°, up and down. The V-bars or command bars 6 and 7 display computed steering commands by indicating the attitude with respect to the horizon that the aircraft should assume.

The attitude indexes in 5° increments on the tape provide references for the attitude display. A bank indicator is above the tape display. The rising runway symbol localizer pointer (not pertinent to our invention) is driven by the radio altimeter and indicates the last 200 feet of altitude. The instrument also shows other indications. (See Collins descriptive literature on their FD-209 Flight Director System.)

Figure 2:
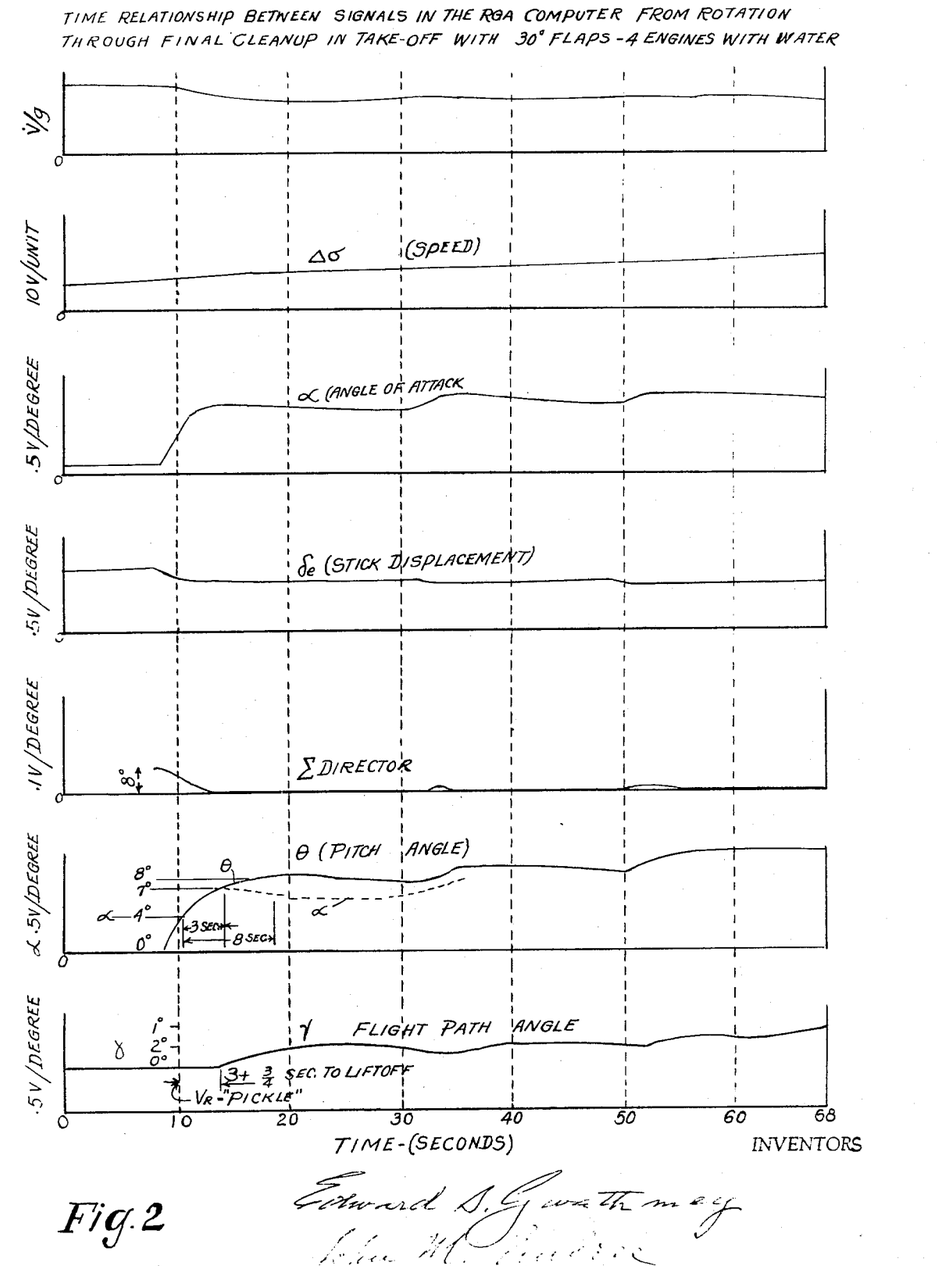
FIG. 2 includes a plurality of curves having time as abscissas and ordinates as indicated.

The curves displayed in FIG. 2 show the relationships of the variables indicated.

Figure 3:
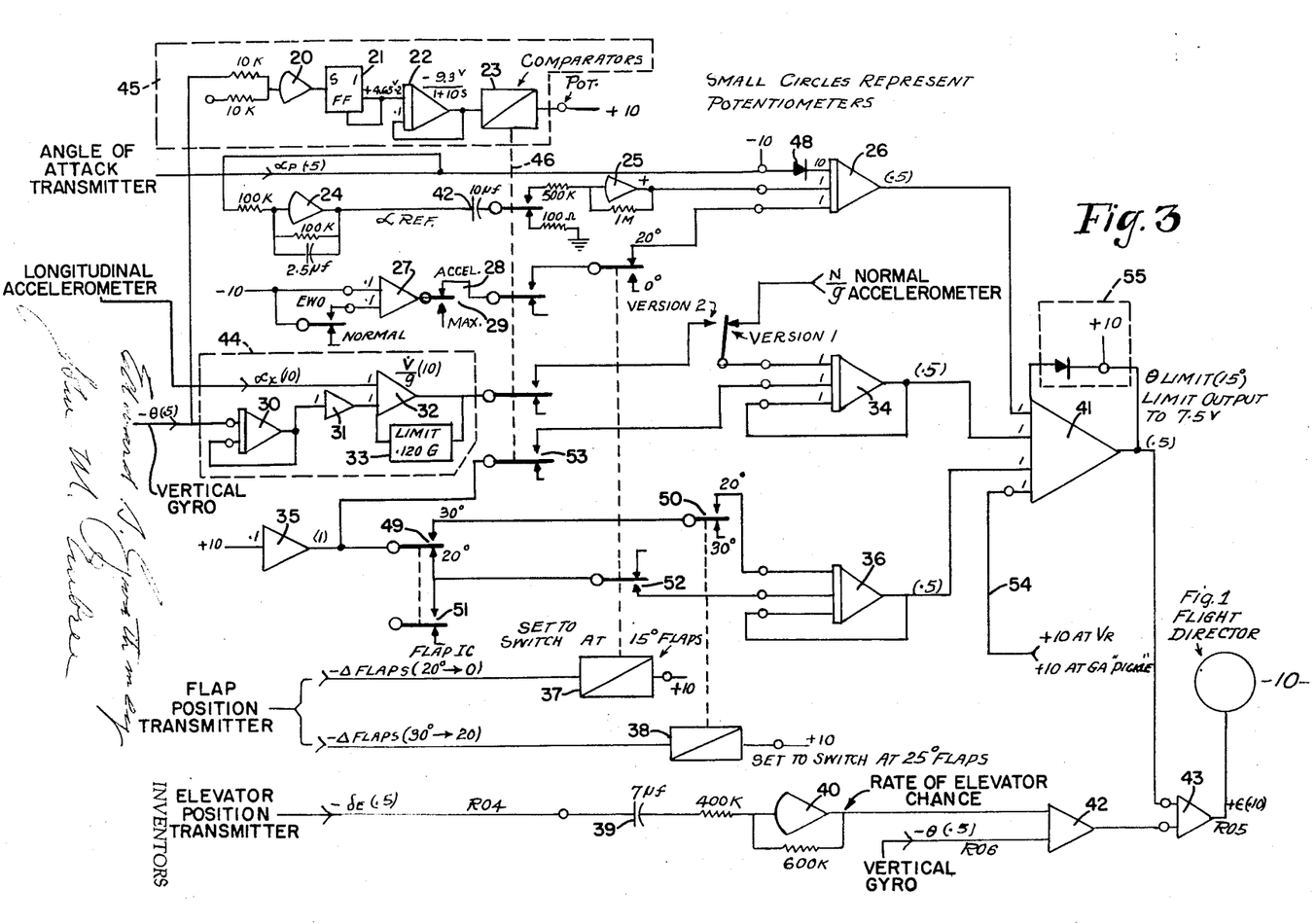
FIG. 3 is a circuit diagram for our RGA system.

Our circuit shown in FIG. 3 was used for the "KG-135 Aircraft Simulation RGA Computer Analog Program" and for flight tests in various aircraft. The various inputs are indicated and the output leads to the Collins Flight Director 10. This instrument has been described briefly above.

FIG. 4 illustrates our RGA Computer Simplified Block (Flow Diagram) circuit. The various inputs are shown and the output is shown as leading to Flight Director Instrument 10 which is shown in abbreviated form.

In our RGA system a unique feature is incorporated in that the command bar of the flight director responds to an initial pitch attitude command and also to a subsequent auxiliary pitch attitude command which comes in to increase the pitch attitude as the flight path angle increases as a result of the response of the aircraft to the initial pitch attitude command. The auxiliary command serves two purposes (a) Since $\gamma = \theta - \alpha$, in order to maintain $\alpha$ and hence climbout speed close to the value at lift-off, as $\gamma$ increases at lift off, $\theta$ must be increased. This is especially important to maintain the angle of attack for climbout for heavy gross weights and minimum thrust conditions; (b) splitting the command in this manner provides the correct increased pitch attitude for climbout and avoids an excessive command for rotation and hence avoids over-rotation. The pitch attitude required during climbout is greater than the pitch attitude required for initial lift-off.

Splitting the pitch attitude command into initial and auxiliary commands allows the initial rotation command to be the same for all gross weights and thrust conditions, on a given aircraft for a given wing flap setting. In this way the pilot has to learn only one maneuver. The auxiliary command may be made to compensate for gross weight and thrust variations.

The auxiliary command is composed of a fixed part (+1°) together with either longitudinal or normal acceleration along with angle of attack reference and when used in the accelerate climb mode the linear speed up integral commands a continuous lowering of the pitch attitude.

We provide damping or compensation of the command by using stick rate input, flap position, and in version 1 normal acceleration. A variation of the compensation can be had as in version 2 by using longitudinal acceleration instead of normal acceleration. Use of longitudinal acceleration requires compensation for pitch error due to the effect of gravity on the accelerometer mass. Angle of attack information is obtained by measuring angle of attack from a reference angle which is obtained a few seconds after the rotation maneuver has been initiated. We prefer to take the information 3 seconds after the pitch angle has increased by 4°.

The use of 3 second timing to capture the angle of attack reference provides a variable angle of attack reference, which has several advantages over a fixed reference. These advantages include: (a) It allows for wide variation in pilot technique; (b) It eliminates the need to vary the reference manually to accommodate widely ranging aircraft gross weight and power conditions; and (C) It avoids the requirement for exact calibration of the angle of attack measurement. Likewise, a practical method is to obtain the angle of attack reference by measuring the peak angle of attack during the interval between 3 and 8 seconds after the pitch angle has increased 4°. The advantages of the later method are: (a) It allows for wide variation in pilot technique; (b) It allows the angle of attack reference to be corrected continually over the time interval as the pilot nulls his command bar; and (c) It avoids the situation where the pilot might tend to "dump" the angle of attack after a fast rotation. It tends to maintain the command angle of attack rather than dumping.

There are three disadvantages of a fixed angle of attack reference:
1. It is difficult to calibrate and install accurately on the aircraft.
2. It does not provide for the correct reference for widely ranging aircraft gross weight and power conditions.
3. A fixed angle of attack reference has the disadvantage of controlling air speed at the expense of the flight path. In our adaptive angle of attack reference, we maintain a flight path by allowing variation in air speed over a safe acceptable range. Such variations in air speed are obtained by early and late rotations. For example, we can allow a variation of ± 10 knots from the recommended rotation speed. Other advantages of our variable angle of attack reference are that it allows installation without attention to calibration other than gain and also allows use of the same control system for various aircraft.

There is a major advantage of the combination of pitch $\theta$ and angle of attack $\alpha$. The pitch is an immediate input which does not have to be smoothed. The angle of attack signal is often noisy in which case we use a filter up to 5 seconds.

We use a split command for the pitch attitude, first introducing the main attitude command or vertical steering for 8°. After rotation is started we then introduce normal acceleration in version 1 and longitudinal acceleration in version 2 and a fixed supplementary attitude command which is lagged (5 seconds) to provide a smooth transition. We employ a speedup command which is a time integral function which gradually lowers the command bar. As the pilot tracks the command bar the attitude of the aircraft is lowered, reducing the angle of attack and speeding up the aircraft. This has the virtue of automatically accelerating the aircraft to flap retraction speeds, which has particular merit for:
1. In aircraft using water injection on hot days. Flap retraction speeds will be reached before end of water injection, without requiring the pilot to concern himself with level-off altitudes, etc.
2. In aircraft without water injection the pilot does not need to concern himself with level-off altitudes.
3. The aircraft will be flying a higher path and maintaining a faster rate of climb as the result of flying in a more favorable part of the drag curve through his climb.

During flap retractions, we introduce increased attitude command to compensate for loss of lift. We employ a weight-on-wheels signal, by means of switch means or otherwise, and when this signal occurs in the approach mode the computer automatically changes to the take-off mode. In the go-around mode we compensate our command for the initial attitude and rate of descent of the aircraft by introducing an additional $-\theta$. Thus if the aircraft is in a steep attitude with a rapid rate of descent our command will be less. Our RGA system by incorporating normalized angle of attack permits the pilot to make optimum safe climbouts. By "normalized" angle of attack we mean ratio of actual angle of attack to angle at which stall would occur.

Our system has an angle of attack limit which automatically depresses the command bar as a time integral of the amount by which the angle of attack exceeds a pre-set reference. We also incorporate means whereby the command will never exceed a predesignated reference (15°). This is done by electrically limiting the command output. Our angle of attack limit and stick rate limit go directly to the output of the computer. These by-pass the 15° limit.

The angle of attack limit requires a preset limit reference angle which is higher than the normal operating range of angle of attack. This is a separate and different function which does not interfere with operation of the variable angle of attack reference obtained during normal takeoff rotations.

FIRST VERSION OF RGA—USING NORMAL ACCELERATION N

The RGA Command equation in abbreviated form, retaining only what is pertinent to its handling or tracking characteristics, is given below:

$$\epsilon = \theta_o - \Delta\theta + \frac{0.5s\delta_o}{1+2.8s} - \frac{2.0\Delta\alpha}{1+5s} + \frac{18N}{(1+L/s)(1+3s)g} \quad (6)$$

where s is the LaPlace operator, $\delta_e$ is elevator displacement, $N$ is acceleration normal to the aircraft longitudinal axis and the other terms are defined as in equation (3) to which equation (6) converges as $S \to 0$. It will be seen that $\theta$ and $\delta_e$ terms significantly contribute to the $\epsilon$ signal at higher frequencies whereas the angle of attack and normal acceleration are heavily smoothed and thus contribute very little noise at higher frequencies which can be encountered in turbulent air. The value of the time constants are determined in relation to requirements of flare shaping, system reaction to sudden loss of thrust, and other factors.

SECOND VERSION OF RGA USING LONGITUDINAL ACCELERATION

The RGA Command equation in abbreviated form retaining only what is pertinent to its handling or tracking characteristics, is given below:

$$\epsilon = \theta_o - \Delta\theta + \frac{0.5s\delta_e}{1+2.8s} - \frac{2.0\Delta\alpha}{1+5s} + \frac{0.63}{1+5s}\cdot\frac{sV}{g} \quad (7)$$

where s is the LaPlace operator, $\delta_e$ is elevator displacement, $V/g$ is acceleration along the aircraft longitudinal axis and the other terms are defined as in equation (3) to which equation (7) converges as $S \to 0$. It will be seen that $\theta$ and $\delta_e$ terms primarily contribute to the higher frequency components of $\epsilon$, the angle of attack and the acceleration terms being very heavily smoothed. Actually, a five-second filter for $V/g$ could be much less, insofar as tracking is concerned, since it is well filtered by the aircraft's inertia. The value of this time constant is determined in relation to requirements of flare shaping, system reaction to sudden loss of thrust, and other factors.

We have demonstrated, by flight tests at high performance that $\alpha$ and $N$, or $V/g$, do not materially affect the pilot's tracking problems. Climbouts were made on = 15! pitch limit. When this situation occurs all terms of the RGA equation except $\theta$ and the $\dot{\delta}_e$ (where $\dot{\delta}_e = s \delta_e$) term are combined and "hard" limited in the computer at a 15° value. By successively decreasing and restoring the thrust the pitch limit can be removed and restored. Pilots have noticed little difference in handling characteristics in and out of the limit whether in rough air or smooth. Of course, in turbulence, there is a difference in the frequency content of $\epsilon$ that is contributed by the angle of attack input. It appears, however, that this difference is practically reduced to insignificance by the 5-second filter.

The elevator rate term $\dot{\delta}_e$ is present at all times. While its influence on the position of the command bars is scarcely discernible during tracking, the slight phase advance which it imparts to the bars has been found to aid tracking and to contribute appreciably to the damping of the aircraft's short period mode of oscillation. This damping is particularly important in preventing overshoots during go-around and take-off rotations. Availability of the $\theta$ parameter provides the means accurately to compensate the output of the longitudinal accelerometer. Our investigations had established that this correction could be approximated by the use of a $\alpha$ instead of $\theta$ if sufficient averaging is applied and if the long term error is compensated by a greater gain for the vertical speed input. However, this approach was inexact and never wholly satisfactory. With the elimination of $h$ and the explicit introduction of $\theta$ in our revised system, straightforward computation of $V/g$ became possible for the second version of our RGA computer.

As shown in connection with equation (3), our system uses $\Delta\theta$ for rotation and thereby eliminates any error due to a false vertical reference signal at the time of rotation. Until lift-off, $\Delta\theta$ gives the exact change in true angle of attack. As soon as $\gamma$ appears, following lift-off, $\alpha$ becomes less than $\Delta\theta$ and therebefore the use of $\Delta\theta$ reduces the likelihood of over-rotation. The principal advantage gained by using $\Delta\theta$ as opposed to $\Delta\alpha$ for take-off rotation is that a time lag is avoided. Since the angle of attack transmitter is located a considerable distance $l$ ahead of the main landing gear, there is a component of local airflow velocity downward for positive pitch rate. The effective magnitude of this velocity, as it affects true angle of attack is $l\dot\theta$. While not large, this produces some delay in the measurement of the body, (or wing angle of attack, which in turn contributes to any tendency toward over-rotation. It can be demonstrated on a simulator that the effect is not trivial.

For the go-around rotation, three advantages of our novel RGA system based upon utilization of $\theta$ will be mentioned.

1. Removal of the $l\dot\theta$ lag just discussed.
2. Avoiding the noise content which would be present in an insufficiently filtered $\alpha$ when turbulent air is present. Data taken during flight testing of our system in a KC-135 aircraft shows that the disturbances of $\alpha$ due to the vertical velocity components of air mass motion are negligible as long as the main gear is in contact with the runway. These components begin to show up when the aircraft is airborne and often become appreciable at heights between 50 and 100 feet. The use of $\Delta\theta$ as the feedback during the take off rotation eliminates this problem.
3. It is essential that a sufficiently steep climbout path be achieved after the descent is arrested, independently of the angle of descent at the point of initiating the go-around. It would appear from this that the magnitude of the rotate command should be adjusted by adding a component just equal to the negative of the value of $\gamma$ at the start. Further study produced a simpler and better way of adjusting the rotation command for initial conditions. When the aircraft is exactly on speed in approach, in a given configuration, its angle of attack is always the same. In fact, all "on-speed" approaches are by definition at one "normalized" angle of attack. For such approaches $\theta$ provides a knowledge of $\gamma$ and could be used (with appropriate offset) in place of $\gamma$ to adjust the rotation command. If, however, the approach were off-speed, the command would be less for a slow approach than for a fast one. This difference happens to give a desirable shading of the command by amounts which tend to cause the peak angle of attack during the pull-up to be the same whether started with the correct angle of attack or not.

The principal aircraft RGA requirement is to furnish a vertical steering cue for the pilot to guide him through rotation and climbout so that he can safely, easily, and confidently accomplish the following:

a. ON TAKE-OFF
1. Rotate the aircraft through the correct pitch angle to the correct angle of attack, neither over-rotating nor under-rotating, and safely adapting for wide differences in pilot technique.
2. Obtain the correct climbout speeds and pitch attitudes required to make obstacle clearances in accordance with the appropriate flight manual.
3. When maximum close-in obstacle clearance is not a major requirement, make a continuously accelerated climb to clean up before the end of water injection, at a predictable safe altitude.
4. Obtain continuous vertical steering for optimum guidance following partial or total loss of thrust caused by loss of one or more engines or loss of water injection, staying well away from stall.

b. on GO-AROUND

For missed approaches, rotate the aircraft to the optimum angle for the thrust available, with minimum loss of altitude from any controlled rate of descent normally used on the approach.

As a specific example, even routine KC-135 aircraft take-offs must be expertly made. Because of difficulties in estimating and reading pitch angles before and during rotation, and because of the impossibility of mentally computing airspeed, angle of attack, rate of climb, flight path angle, gross weight, outside air temperature, and pressure altitude to make climbouts in accordance with the flight manual there can be no such thing as a "routine" take-off even with four engines and three engine heavy-weight take-off is a particularly hazardous maneuver. Loss of an engine during take-off compounds all of the other problems and difficulties, creating severe problems for the pilot.

Present aircraft or aircraft controls and particularly KC-135 aircraft have the following deficiencies:

a. Present instrumentation aboard the aircraft does not provide a sufficient margin of safety for normal operating conditions.
b. Just prior to rotation, it is a very demanding task on the pilot to establish a reference point for the rotation angle.
c. The airspeed indicator and other pressure instruments referred to the static pressure are (temporarily) unreliable during rotation and until body attitude has stabilized after rotation.
d. The pilot has difficulty in precisely reading the attitude indicator.
e. Attitude indicators, as presently used, are unsatisfactory for the rotation segment of the take-off.
f. The attitude indicator is the only flight instrument that can be used after rotation until the gear is fully retracted (about 17 seconds after $V_R$ in the KC-135).
g. The initial climb segment during a three-engine climb is a very demanding flight maneuver in a zone where performance margins are extremely narrow. This is further reduced in the KC-135 by spoilers.
h. Rudder forces are high in initial climbout on three engines until attaining higher speeds and until flap retraction has been completed, and hence, it is desirable normally to accelerate and clean up as soon as possible in all cases where the maximum rate-of-climb is not required immediately for close-in obstacle clearance. The accelerated mode of operation of our RGA system provides the necessary vertical steering cue to the pilot to accelerate smoothly and continuously after rotation, and also provides additional attitude commands during flap retraction to produce the minimum reductions of rate-of-climb due to loss of lift as the flaps are retracted.
i. Our experimentation has shown that it is not enough for our RGA computer merely to make the necessary computations to direct the rotation and guide the flight path. The greater task was to design a system which would be pitch-like during rotation and easy to track in rough air. Until we finally succeeded we tried many systems which seemed excellent on the simulator and when flown by autopilot but which could not win pilot acceptance and pilot confidence. Thus, pilot acceptance is quite important. The system must fly like pitch but must be superior to pitch by continuously providing the correct guidance.

Problems in our early RGA system were in the dynamics of the signals, dynamics of the aircraft, dynamics of the presentation, and in the dynamics of the pilot-instrument flight controls interfaces. Our present RGA system overcomes all of these problems and is essentially pitch-like in all modes of operation. On rotation, our system uses pure pitch attitude command. At the top of the rotation additional pitch attitude command comes in smoothly to the degree and at the rate required to establish the correct flight path. Gyro error from all sources is compensated for at rotation. During the rotation, the steering cue moves down with the pitch tape (see FIG. 1) and at the same rate, providing excellent pitch rate information to the pilot. It is easy for the pilot to track the command bar all the time the RGA system is on the director. Just enough stick lead is provided to the steering cue command to compensate for some of the aircraft and signal lags and to eliminate the "hunting" problem as the pilot tracks the steering cue command.

In go-around there is no speed-up command. The advantages of using the "accelerated" climbout mode for take-off are as follows:

1. The pilot receives a cue which accurately commands a continuous speed-up, cleaning up before the end of water injection at the height equal to or greater than the level-off altitude of the flight manual.
2. In the accelerated mode the pilot receives additional attitude command during flap retraction to compensate for loss of lift and maintain the rate of climb.
3. In the 30° flap take-off, two additional attitude commands are given automatically; the first as the flaps are raised from 30° to 20° and the second when the flaps are raised from 20° to 0°.
4. Using the accelerated mode, the aircraft flies a higher path after end of water than with the maximum mode.

The angle of attack difference $\Delta\alpha$ is used in the equations. The objectives of adaptive $\alpha$ referencing are:
a. To eliminate the requirement of furnishing the RGA computer with an accurate calibration of angle of attack.
b. To furnish the RGA computer with an $\alpha$ reference which is dynamically obtained under actual, (instead of theoretical) lift-off condition.
c. To compensate for wide difference in pilot rotation technique.
d. To eliminate the use of angle of attack as a measured feedback signal before lift-off.
e. To allow large smoothing $[(1)/(1+5s)]$ to be used on the signal in order to remove angle of attack noise.

Important, and novel features of our RGA system are listed below.
1. Greatly improved margin of safety and relief for the pilot from difficult split-second decisions.
2. The steering cue command is automatically positioned to the correct rotation angle. The pitch reference is computed automatically in the computer and the pilot does not have to think about it. Gyro errors are cancelled at initiation of rotation.
3. It benefits from the advantages of the Collins three-dimensional steering cue command display which together with the three-dimensional aircraft reference eliminates the parallax error which occurs when pitch is read from the tape.
4. The computer display greatly improves the ability of the pilot to make smooth, correct rotations. The rotation maneuver is essentially identical for all aircraft thrust and weight conditions. Automatic adjustment of the command for 20° and 30° flaps is provided. The computer automatically compensates for wide differences in rotation techniques between pilots, and for the same pilot at different times.
5. It takes advantage of the highly visible command bar. It is easy to track the bar to within a fraction of a degree.
6. There are no pressure-referred instrument signals of any kind in our RGA system. Angle of attack is measured at a single location in the airstream and is not used during the rotation maneuver. Pressure instruments referred to static pressures are temporarily unreliable during rotation and until body attitude has stabilized after rotation.
7. The accelerated mode of the RGA, used whenever maximum is not required for maximum close-in obstacle clearance, continuously accelerates the aircraft in a controlled manner, relieving the pilot from the high rudder forces as soon as possible; also makes predicted profiles.
8. Our RGA system provides a continuous vertical steering cue for safe guidance following partial or total loss of thrust, staying well away from stall.
9. On go-around it has previously been a problem for the pilot to obtain minimum loss of altitude and optimum rate of climb for the power available in a smooth nose-up rotation maneuver without risk of stall. Our RGA system solves this problem for the pilot, on the go-around from any controlled rate of descent. Compensation for glide-slope angle is automatic.
10. Our system keeps the aircraft well out of phugoid or short-period oscillations and does not excite any other mode of oscillation, during take-off, or go-around, through wind shears or loss of thrust.
11. Our RGA system handles very well through rough air. The command bar of the attitude director indicator as shown in FIG. 1 does not bounce or wander and it remains easy to track. The system inherently produces rate-of-climb recovery through wind shears.
12. In the accelerated mode our RGA system accelerates the aircraft continuously in a controlled manner, giving the pilot vertical steering commands for increased attitude during flap retractions, to compensate for loss of lift and cleaning up before the end of water injection.
13. Our system handles well in cross winds, maintaining smooth vertical steering control.
14. Our system continuously guides the vertical steering of the aircraft, automatically providing the planned flight path without requiring any in-flight computation, adjustments, or vertical steering decisions by the pilot.

To recapitulate the material set forth hereinabove, attention may first be directed to the equations, and thereafter to the circuit schematics in FIGS. 3 and 4.

Equation 6 indicates that the desired command pitch information $\epsilon$ is derived by combining certain available input data in accordance with the relationship set forth in the equation. $\theta_c$, represents the fixed rotation command for the particular aircraft involved and has been recognized as being flap dependent. $\Delta\theta$, is the difference between the conventional gyro output after initiation of rotation and the output of the gyro prior to initiation of rotation. $\delta_e$ represents the elevator displacement. This input is available in analog form from a conventional elevator position transmitter. $\Delta\alpha$, is related to the angle of established attack during rotation. It is derived from analog information available from a conventional angle of attack transmitter. Finally, $N$, is acceleration normal to the longitudinal axis. It is available in analog form from a normal accelerometer. In other words, equation (6) mathematically sets forth the manner in which outputs from conventional equipment should be combined in order to develop a command pitch signal $\epsilon$ which is used as a direct input to a standard flight director instrument.

Analysis of equation (7) can be similarly made, the only difference lying in the fact that in this equation the parameter $V/g$ appears. As explained hereinabove, this parameter represents acceleration along the longitudinal axis of the aircraft. Such acceleration data is available from a conventional longitudinal accelerometer.

FIG. 3 utilizes conventional figures and symbols familiar to most of the people skilled in not only the aircraft instrumentation art, but also the electrical field in general. Thus, for example, amplifiers have been designated by triangles such as elements 20, 24, 27, and 31, appearing in the left quadrant of the figure. Integrators have been shown by elements such as 26, 34, and 36, appearing vertically across the center of the figure. Comparators have been shown by the symbols such as 49–52, appearing in the lower central portion of the figure. Where the integrators are provided with a direct feedback path, as in the case of elements 34 and 36, they are in essence combiners. As well known, amplifiers such as 41, on the right central portion of the figure, may also function as combining circuits wherein the output represents the combination of the inputs.

Functional information on the input and output lead lines and adjacent to several of the operating elements indicates the nature of the outputs and inputs. The input legends illustrate the fact that the functional representations on the corresponding inputs are available from conventional aircraft equipment. In addition, several of the elements are grouped together within and connected by dashed lines for purposes of specifically identifying sub-combinations and inter-related components. An engineer can easily analyze the operation of the circuit in FIG. 3, having the components shown herein, realizing that the inputs vary as shown in FIG. 2 of the drawings, and being cognizant of the equations discussed above.

Broadly, FIG. 3 illustrates the development of the desired command pitch attitude and actual pitch attitude signals for control over the Flight Director 10, shown at the lower right portion thereof. The pitch attitude of the aircraft is provided by the vertical gyro and acted upon by amplifier 42 and comparator circuitry 45. The angle of attack is provided by an angle of attack transmitter and introduced via feedback amplifier 24, capacitor 47, amplifier 25 and integrator 26. The acceleration of the aircraft is obtained from normal and/or longitudinal accelerometers and introduced via amplifiers 32 and 34. Finally, these diverse inputs are combined by units 41 and 43.

The block diagram of FIG. 4 may be referred to for a more graphic depiction of the functions carried out and their relationship in a particular unit. The various blocks in FIG. 4 are designated by primed counterparts of the numbers used to designate generally comparable elements in FIG. 3.

We claim:

1. In an aircraft instrument system, means responsive to pitch attitude of said aircraft, means responsive to angle of attack of said aircraft, means responsive to acceleration of said aircraft, means for indicating command pitch attitude of said aircraft and for indicating actual pitch attitude thereof, and means for combining responses of said responsive means and connecting the combined responses with said indicating means to indicate command pitch attitude and actual pitch attitude of said aircraft.

2. The aircraft instrument system as described in claim 1, said acceleration responsive means being responsive to normal acceleration.

3. The aircraft instrument system as described in claim 1, said acceleration responsive means being responsive to longitudinal acceleration.

4. The aircraft instrument system as described in claim 3, and including means responsive to rate of elevator displacement, means for correcting the longitudinal acceleration response for pitch error, and means for combining said elevator displacement response with the previous said responses applied to said indicating means.

5. The aircraft instrument system as described in claim 1, and including means responsive to rate of elevator displacement of said aircraft, and means connecting said rate responsive means with the aforesaid means for combining responses.

6. The aircraft instrument system as described in claim 1, and including means for providing a linear time integral signal combined with said responses to lower the pitch attitude of the aircraft and thus to command a continuous acceleration of the aircraft.

7. The aircraft instrument system as described in claim 1, said means responsive to pitch attitude providing a subsequent auxiliary pitch attitude command which increases the pitch attitude as the result of the response of the aircraft to the initial pitch attitude command.

8. The aircraft instrument system as described in claim 1, and including means responsive to elevator rate input, means responsive to flap position, and means for combining said elevator rate and flap position responses with the other said responses to affect said indicating means in accordance with elevator rate and flap position.

9. The aircraft instrument system as described in claim 1, and including means responsive to flap movement, and means operatively connecting said flap movement responsive means with said pitch attitude responsive means to increase the pitch attitude command during flap retraction.

* * * * *